| | $a_{10}$ | $a_{11}$ | $a_{20}$ | $a_{21}$ | $b_1$ | $b_2$ | $b_3$ | $b_4$ | $c_{10}$ | $c_{11}$ |
|---|---|---|---|---|---|---|---|---|---|---|
| CODE SPACE | 0 | 1 | 0 | 1 | 0 | 0 | 0 | 1 | 0 | 1 |
| | 0 | 1 | 1 | 0 | 0 | 1 | 0 | 0 | 1 | 0 |
| | 1 | 0 | 0 | 1 | 1 | 0 | 0 | 0 | 1 | 0 |
| | 1 | 0 | 1 | 0 | 0 | 0 | 1 | 0 | 0 | 1 |
| ERROR SPACE | 0 | 0 | X | X | 0 | 0 | 0 | 0 | 0 | 0 |
| | X | X | 0 | 0 | 0 | 0 | 0 | 0 | 0 | 0 |
| | 1 | 1 | 1 | X | X | 1 | 1 | X | 1 | 1 |
| | 1 | 1 | X | 1 | 1 | X | X | 1 | 1 | 1 |
| | 1 | X | 1 | 1 | 1 | X | 1 | X | 1 | 1 |
| | X | 1 | 1 | 1 | X | 1 | X | 1 | 1 | 1 |

X = EITHER 0 OR 1

INVENTORS
WILLIAM C. CARTER
KEITH A. DUKE
PETER R. SCHNEIDER
BY [signature]
ATTORNEY

| | $a_{10}$ | $a_{11}$ | $a_{20}$ | $a_{21}$ | $b_1$ | $b_2$ | $b_3$ | $b_4$ | $c_{10}$ | $c_{11}$ |
|---|---|---|---|---|---|---|---|---|---|---|
| CODE SPACE | 0 | 1 | 0 | 1 | 1 | 1 | 0 | 1 | 1 | 0 |
| | 0 | 1 | 1 | 0 | 0 | 1 | 1 | 1 | 0 | 1 |
| | 1 | 0 | 0 | 1 | 1 | 0 | 1 | 1 | 0 | 1 |
| | 1 | 0 | 1 | 0 | 1 | 1 | 1 | 0 | 1 | 0 |
| ERROR SPACE | 0 | 0 | 0 | X | X | 0 | 0 | X | 0 | 0 |
| | 0 | 0 | X | 0 | 0 | X | X | 0 | 0 | 0 |
| | 0 | X | 0 | 0 | 0 | X | 0 | X | 0 | 0 |
| | X | 0 | 0 | 0 | X | 0 | X | 0 | 0 | 0 |
| | 1 | 1 | X | X | 1 | 1 | 1 | 1 | 1 | 1 |
| | X | X | 1 | 1 | 1 | 1 | 1 | 1 | 1 | 1 |

X = EITHER 0 OR 1

| | $a_{10}$ | $a_{11}$ | $a_{20}$ | $a_{21}$ | $b_1$ | $b_2$ | $b_3$ | $b_4$ | $c_{10}$ | $c_{11}$ |
|---|---|---|---|---|---|---|---|---|---|---|
| CODE SPACE | 0 | 1 | 0 | 1 | 0 | 0 | 1 | 0 | 1 | 0 |
| | 0 | 1 | 1 | 0 | 1 | 0 | 0 | 0 | 0 | 1 |
| | 1 | 0 | 0 | 1 | 0 | 1 | 0 | 0 | 0 | 1 |
| | 1 | 0 | 1 | 0 | 0 | 0 | 0 | 1 | 1 | 0 |
| ERROR SPACE | 0 | 0 | 0 | X | X | 1 | 1 | X | 0 | 0 |
| | 0 | 0 | X | 0 | 1 | X | X | 1 | 0 | 0 |
| | 0 | X | 0 | 0 | 1 | X | 1 | X | 0 | 0 |
| | X | 0 | 0 | 0 | X | 1 | X | 1 | 0 | 0 |
| | 1 | 1 | X | X | 0 | 0 | 0 | 0 | 1 | 1 |
| | X | X | 1 | 1 | 0 | 0 | 0 | 0 | 1 | 1 |

X = EITHER 0 OR 1

| | $a_{10}$ | $a_{11}$ | $a_{20}$ | $a_{21}$ | $b_1$ | $b_2$ | $b_3$ | $b_4$ | $c_{10}$ | $c_{11}$ |
|---|---|---|---|---|---|---|---|---|---|---|
| CODE SPACE | 0 | 1 | 0 | 1 | 1 | 1 | 1 | 0 | 0 | 1 |
| | 0 | 1 | 1 | 0 | 1 | 0 | 1 | 1 | 1 | 0 |
| | 1 | 0 | 0 | 1 | 0 | 1 | 1 | 1 | 1 | 0 |
| | 1 | 0 | 1 | 0 | 1 | 1 | 0 | 1 | 0 | 1 |
| ERROR SPACE | 0 | 0 | X | X | 1 | 1 | 1 | 1 | 0 | 0 |
| | X | X | 0 | 0 | 1 | 1 | 1 | 1 | 0 | 0 |
| | 1 | 1 | 1 | X | X | 0 | 0 | X | 1 | 1 |
| | 1 | 1 | X | 1 | 0 | X | X | 0 | 1 | 1 |
| | 1 | X | 1 | 1 | 0 | X | 0 | X | 1 | 1 |
| | X | 1 | 1 | 1 | X | 0 | X | 0 | 1 | 1 |

X = EITHER 0 OR 1

United States Patent Office 3,559,167

Patented Jan. 26, 1971

3,559,167
SELF-CHECKING ERROR CHECKER FOR TWO-RAIL CODED DATA

William C. Carter, Ridgefield, Conn., and Keith A. Duke, Wappingers Falls, and Peter R. Schneider, Peekskill, N.Y., assignors to International Business Machines Corporation, Armonk, N.Y., a corporation of New York Filed July 25, 1968, Ser. No. 747,533
Int. Cl. H03k *13/22*
U.S. Cl. 340—146.1 8 Claims

ABSTRACT OF THE DISCLOSURE

A series of self-checking error checking circuits are disclosed for checking two-rail logic coded data lines. The data lines are arranged as $n$ pairs of two-rail groups. One form of the checker comprises $n-1$ basic two output blocks connected in a general tree configuration across the two-rail data lines. Each of said basic blocks has two normally complementary output lines and the last stage of the checker is a single basic block. If an invalid code is received, the two outputs will be identical. Malfunctions or failures in the checking circuit are checked by certain legitimate code signals which similarly cause an error representation in the output of the checker whereby both outputs will be identical.

CROSS REFERENCE TO RELATED APPLICATIONS

Reference is hereby made to application Ser. No. 747,522 of W. C. Carter and P. R. Schneider filed concurrently herewith and entitled "Self-Checking Error Checker for Parity Coded Data" and to application Ser. No. 747,665 of W. C. Carter, K. A. Duke, and P. R. Schneider entitled "Self-Checking Error Checker for *k*-Out-of-*n* Coded Data" also filed concurrently herewith for a description of two similar types of self-checking checkers. The self-checking checkers of all of these applications have certain characteristics in common and the cross reference to these applications may be helpful for a better understanding of the principles and operation of the present application. They have been filed separately as they relate to different data coding systems.

BACKGROUND OF INVENTION

As present day electronic computers become evermore complex and sophisticated, the numbers of circuits have increased to gigantic proportions with a concurrent reduction in time for performing a given computation. With this large increase in the total numbers of circuits in today's modern complex computing systems, it will be apparent that the number of locations in which an error or fault can occur, has been greatly multiplied. Moreover, if a given faulty component is producing incorrect data, a great many errors or incorrect computations can be produced within a very short space of time until the fault is detected.

In the past many schemes have been proposed for detecting errors in various sections of a computing system. Probably the most wide spread is the use of parity checking wherein an extra bit or bits accompany the transmitted data bits and are utilized to indicate the proper data content of a particular transmission, i.e., normally the parity bit indicates whether an odd or even number of "1's" appears in the data transmission proper. However, for such parity checking systems, means must be provided for detecting and generating the proper parity bits at various transmission points within the computer and additional means must be provided for checking the parity. In the past most checking systems have not themselves been checkable during normal data processing. In other words, if the checker failed so as to indicate an "error free" condition, subsequent errors would obviously go undetected until some other means picked up the system error.

With the increasingly greater load, which must be borne by the customer engineers who have the responsibility of maintaining and repairing computers, any reliable diagnostic circuits built in a computer system are of invaluable aid, both in terms of indicating that an error is present in the system and wherever possible the precise location of the faulty hardware. In the past the provision of large amounts of error detection circuitry has been considered prohibitive in terms of hardware cost. However, with the vastly more complex present day computers and the extreme difficulty in obtaining and training qualified service personnel, the cost disadvantage of reliable diagnostic equipment and circuitry built into the computer is becoming more attractive.

Further, the advent of integrated circuit technology is rapidly reducing the cost of individual circuit blocks to the point where heretofore financially unfeasible hardware installed for the purpose of error detection and correction is beginning to look more attractive.

It will be apparent from the following description of the present invention that the primary concern hereof is the provision of hardware for the detection of errors occurring within a computing system, both function circuits and checking circuits. The particular use made of the error detection information once obtained forms no part of the present invention and accordingly will not be specifically spelled out. However, it will be obvious to one skilled in the art that such information could readily be used for either automatic repair or for merely giving indications to appropriate service personnel for diagnostic and repair purposes.

SUMMARY OF THE INVENTION AND OBJECTS

It has now been found that a self-checking error checking circuit for two-rail coded data may be provided which will provide an error indication upon the occurrence of an error in the data received or in the operation of the checker itself. In a preferred embodiment the checker has two inputs both of whose values change for any single legitimate change of value of an input signal pair but only one of whose values changes for a change in only one signal of an input signal pair.

The self-testing checking circuits proposed by the present invention have two primary characteristics. The checker output distinguishes the presence of code message inputs and error message inputs, i.e., code message inputs produce one set of checker outputs and error message inputs produce a completely different (disjoint) set of checker outputs. For every given failure in the checking circuit there exists at least one code message input which tests for that given failure, i.e., given the failure, when the proper code message is applied the checker will produce an output different from that produced when code messages are applied to a correctly functioning checking circuit. The first characteristic insures that the checking circuit can be used to detect the presence of error messages. The second characteristic insures that the checking circuit is completely self-testing during the normal processing of code messages. Special mechanisms to test for the correct operation of the checking circuitry are eliminated.

These two characteristics require that the checking circuits have more than one output. If only one output existed, the first characteristic would require that the output take on one value, say 1, for code messages and the opposite value, say 0, for error messages. But then the second characteristic could not be satisfied since the checker output could fail in the stuck-at-1 position and application of code messages would never detect this failure.

It should be noted that this failure also disables all future error detection ability, thus more than one output is mandatory.

For simplicity of discussion, each checking circuit to be described in detail here will have just two outputs. These two outputs satisfy the first characteristic by becoming either "01" or "10" for code message inputs and either "00" or "11" for error message inputs. Given a failure in the checking circuit, the second characteristic is satisfied by having at least one code message test for this given failure by producing either a "00" or "11" output if the failure exists. Most of the circuits will be shown in AND-OR or OR-AND configurations but it is always possible to perform commonly known transformations to change them to NAND or NOR logic.

Such a checking circuit when designed for the special case of two-rail logic coded data may be implemented as a series of basic "exclusive OR" equivalence blocks wherein each block receives two two-rail encoded inputs and produces a single two-rail output if the inputs are correct and the circuit is working properly. The precise manner in which such circuits are designed to form such a checker will be apparent from the subsequent description of the disclosed embodiments. Checker designs are also proposed wherein the total numbers of logic levels and thus propagation time within the checker may be reduced by suitably choosing and combining the individual logic circuits within the checkers basic circuit blocks.

It is accordingly a primary object of the present invention to provide an error checking circuit which is itself testable.

It is a further object to provide such a checking circuit for use to test two-rail logic coded data.

It is yet another object to provide such a checking circuit having at least two different outputs when an error free condition is present.

It is a still further object to provide such a checking circuit which produces a readily discernible output signal whenever an error is detected in the coded data or the checker itself is defective.

It is a further object to provide such a checking circuit constructed of two distinct logic trees wherein the final output of each tree is a single binary function.

It is another object to provide such a checking circuit constructed of conventional logic blocks.

It is another object to provide such a checker for an input data line comprising $n$ two rail coded pairs which comprises up to $n-1$ basic blocks for providing the required two checker output.

It is a further object to provide such a checker wherein adjacent cricuits in adjacent basic blocks may be merged to reduce logic levels.

The foregoing and other objects, features and advantages of the invention will be apparent from the following more particular description of preferred embodiments of the invention as illustrated in the accompanying drawings.

DESCRIPTION OF THE DISCLOSED EMBODIMENTS

The objects of the present invention are accomplished in general by a self-checking error checking circuit for use with two-rail logic coded data including two logic circuit means each having a separate output, means for interconnecting said networks so that both of said output values change for any single legitimate change of value of an input signal pair and only one of whose values changes for a change in only one signal of an input signal pair. Each of said networks consists of one or more basic two-input two-rail signals and a single two-rail output.

As will be apparent from the subsequent description, each of said basic logic blocks in essence comprises a two-input two-rail Exclusive-OR. It will be noted from the subsequent description that the two inputs are each two-rail and the single output is also two-rail. The individual basic logic blocks may be logically designed as AND-OR logic sequences, OR-AND logic sequences, NAND blocks, or NOR blocks. Depending upon the particular logical blocks and sequences utilized, a reduction of the total number of logic levels is possible. An ultimate reduction of the checker to as few as two total logic levels is also generally described.

Two-rail logic represents every independent bit of a data message or word as a signal pair which carries the "true" and "complement" values of that bit. A message containing $n$ independent bits is therefore transmitted as a $2n$-bit message. Thus, out of the $2^{2n}$ messages of length $2n$, there are exactly $2^n$ legitimate code messages, with the remaining messages being interpreted as errors. Each signal pair of a code message carries either the value "01" or "10." If any one or more signal pair carries the value "00" or "11," the message is an error message.

Hitherto, it has been customary to check multiple-output two-rail circuits by attaching a 2-input exclusive OR circuit to each signal pair and feeding their outputs to a single AND gate. Such a circuit is completely untestable with code messages and requires an extensive set of error messages for thorough testing. Furthermore, it has been shown that a checker must have multiple outputs if it is to be completely self-testing with code message inputs.

The circuits described here combine two or more two-rail logic signal pairs to produce a single signal pair. This signal pair carries a valid two-rail code message (i.e.

"01" or "10") if and only if every input pair carries a valid two-rail code. If any one or more input pair carries an invalid code (i.e., "00" or "11") then the output is an invalid code. Furthermore, both valid output codes may be produced by the application of valid input code messages. Also, in common with all two-rail circuits, since the two output signals are generated independently, a failure in one of the generating circuits will manifest itself as an invalid output code for at least one code input.

Figures 1, 1A:
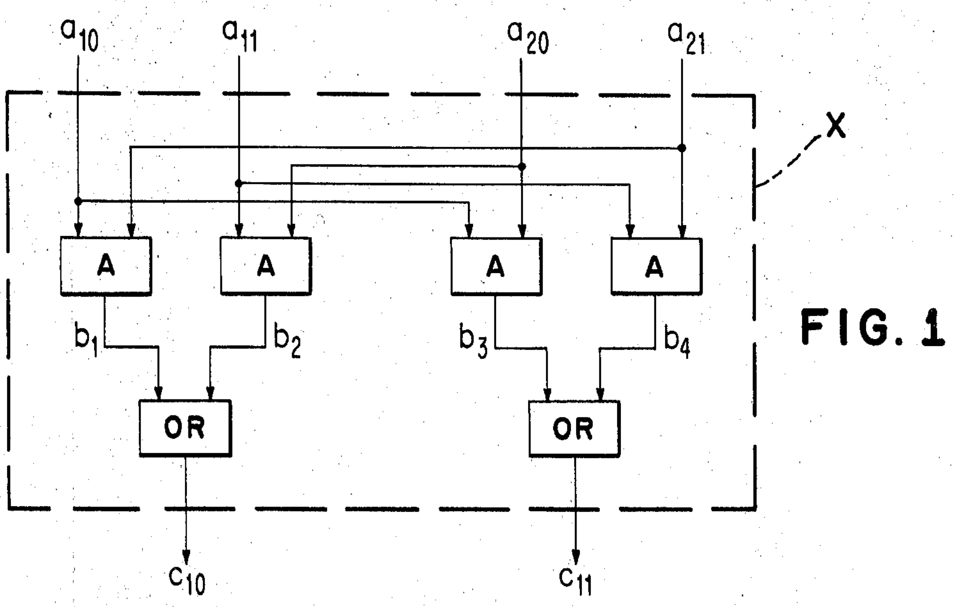
FIG. 1 comprises a logical schematic diagram of a basic circuit building block for a self-checking checker for two-rail logic incorporating the principles of the present invention.
FIG. 1A comprises a table illustrating circuit response to all input data patterns for the circuit of FIG. 1.

Such a circuit with two input signal pairs is illustrated in FIG. 1. The AND-OR equation is:

(1)
$$c_{10}=a_{10}\cdot a_{21}\vee a_{11}\cdot a_{20}$$
$$c_{11}=a_{10}\cdot a_{20}\vee a_{11}\cdot a_{21}$$

The table of FIG. 1A illustrates the circuit response to all possible input patterns. This table divides the input patterns into code messages and error messages. It will be seen that every point in the circuit is fully exercised by code messages. It should also be noted that the circuit of FIG. 1 is a two-rail logical "equivalence" circuit (i.e., $c=a_1\equiv a_2$). Alternatively, by interchanging $c_{10}$ and $c_{11}$ the circuit may be regarded as a two-rail "exclusive OR" circuit.

Figures 2, 2A:
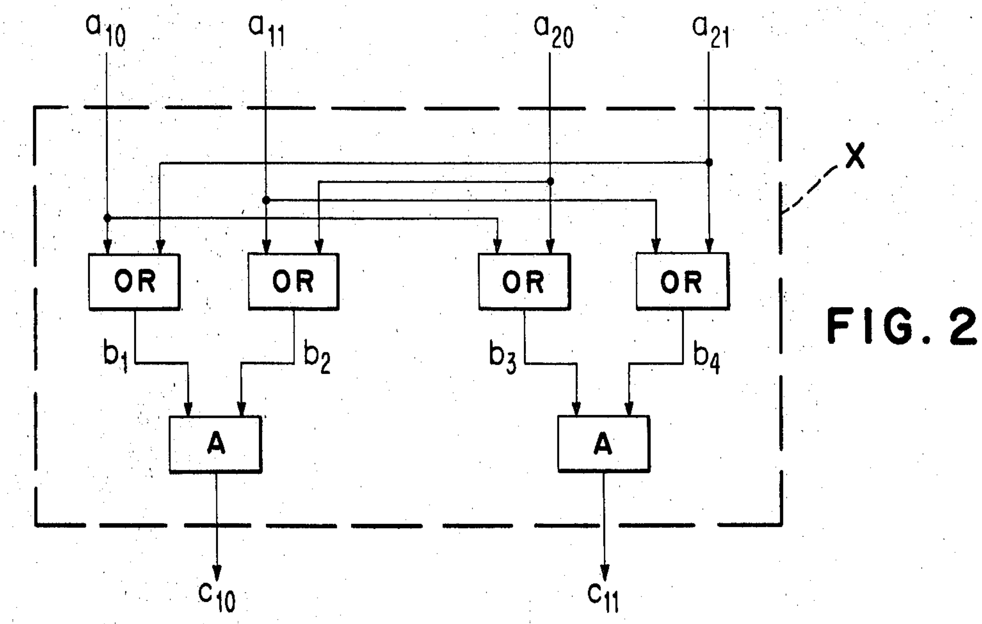
FIG. 2 comprises a logical schematic diagram for an OR-AND basic building block similar to the circuit of FIG. 1 constructed in accordance with the teachings of the present invention.
FIG. 2A is a table similar to FIG. 1A illustrating the circuit response to all input data patterns for the circuit of FIG. 2.
Figures 3, 3A:
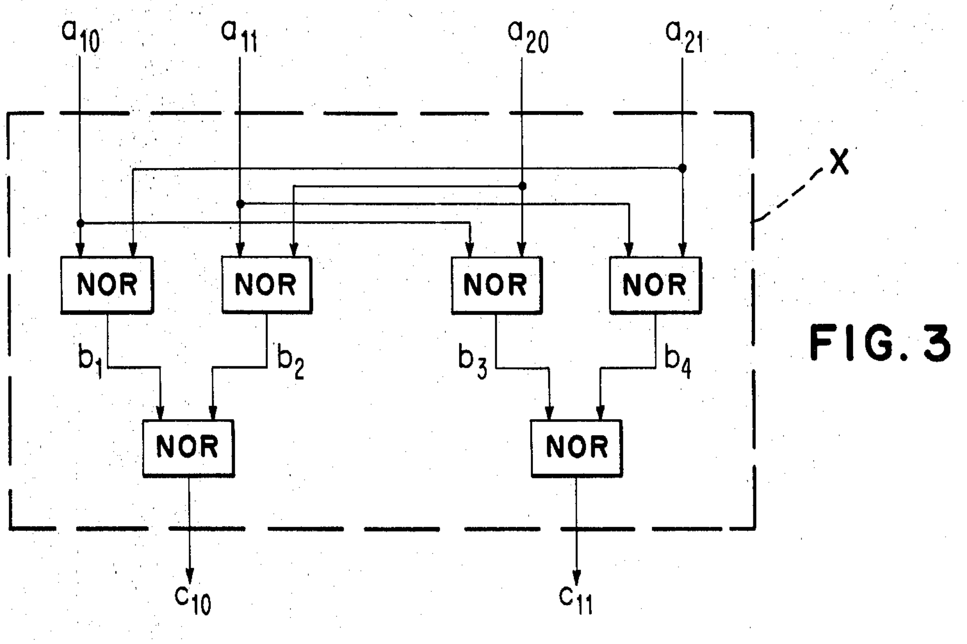
FIG. 3 comprises a logical schematic of a basic building block of the self-checking checker constructed of NOR logic elements in accordance with the teachings of the present invention.
FIG. 3A is a table illustrating circuit response to all possible input patterns for the circuit of FIG. 3.
Figures 4, 4A:
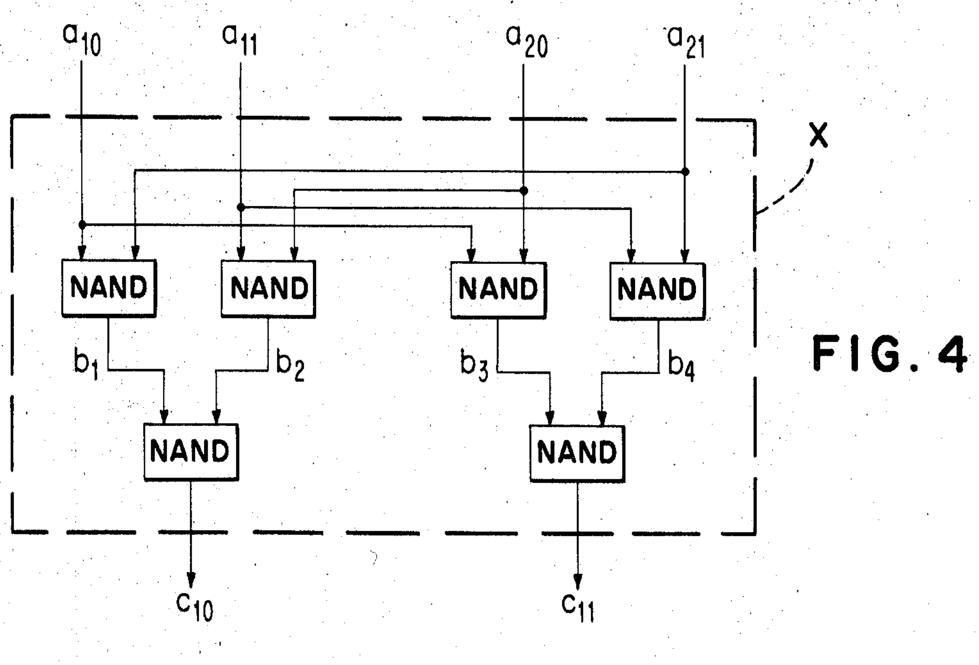
FIG. 4 comprises the logical schematic diagram for a basic building block circuit similar to FIGS. 1, 2 and 3 constructed in NAND circuit elements.
FIG. 4A comprises a table illustrating the circuit response of FIG. 4 to all possible input patterns.

Alternative forms of this basic circuit with the same characteristics are illustrated in FIGS. 2, 3 and 4 and their responses are illustrated in the tables shown in FIGS. 2A, 3A and 4A respectively. Their respective equations are:

OR–AND $c_{10}=(a_{10}\vee a_{21})\cdot(a_{11}\vee a_{20})$ (2) $c_{11}=(a_{10}\vee a_{20})\cdot(a_{11}\vee a_{21})$ NOR $c_{10}=(a_{10}\downarrow a_{21})\downarrow(a_{11}\downarrow a_{20})$ (3) $c_{11}=(a_{10}\downarrow a_{20})\downarrow(a_{11}\downarrow a_{21})$ NAND $c_{10}=(a_{10}|a_{21})|(a_{11}|a_{20})$ (4) $c_{11}=(a_{10}|a_{20})|(a_{11}|a_{21})$ It should be noted again that all of these circuits constitute two-rail "exclusive OR" or "equivalence" circuits.

Figure 5:
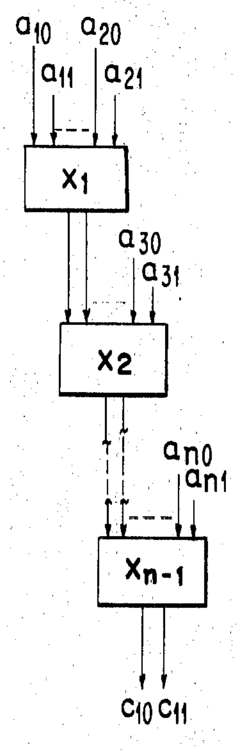
FIG. 5 is a functional block diagram of a first embodiment of a self-checking checker constructed in accordance with the teachings of the present invention and utilizing a plurality of basic building blocks to achieve a self-checking checker for two-rail logic.
Figure 6:
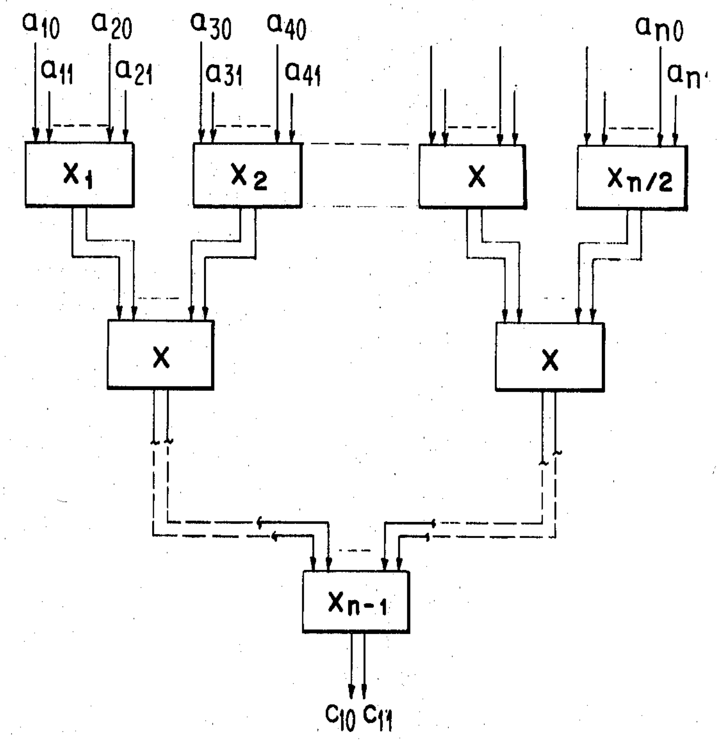
FIG. 6 is a functional block diagram of an alternative embodiment of a self-checking checker similar to that of FIG. 5.

The circuits of FIGS. 1, 2, 3 and 4 may be combined in tree-like arrangements to produce self-testing checkers for more than two signal pairs. Two such arrangements are shown in FIGS. 5 and 6. The arrangement of FIG. 5 has advantages if the incoming signal pairs are not all generated at the same time as in an adder or multiplier where low order bits are generated first. Those signal pairs generated early are entered at the top of the tree and those generated later are entered at the bottom of the tree where the signals must pass through fewer circuit levels to affect the output. The arrangement shown in FIG. 6 has advantages when all the signal pairs are generated at the same time (or in an unknown order). In this case the maximum number of levels through which a signal must pass to affect the output is at a minimum, i.e., the time to generate the check signal is minimum.

Other arrangements which comprise the characteristics of the two checking circuits shown in FIGS. 5 and 6 can be constructed. All such arrangements use exactly the same number of basic circuits, i.e. $n-1$ basic circuits are required to check $n$ signal pairs. In any such arrangement, any of the circuits of FIGS. 1, 2, 3 and 4 may be used and may be intermixed.

Figure 7:
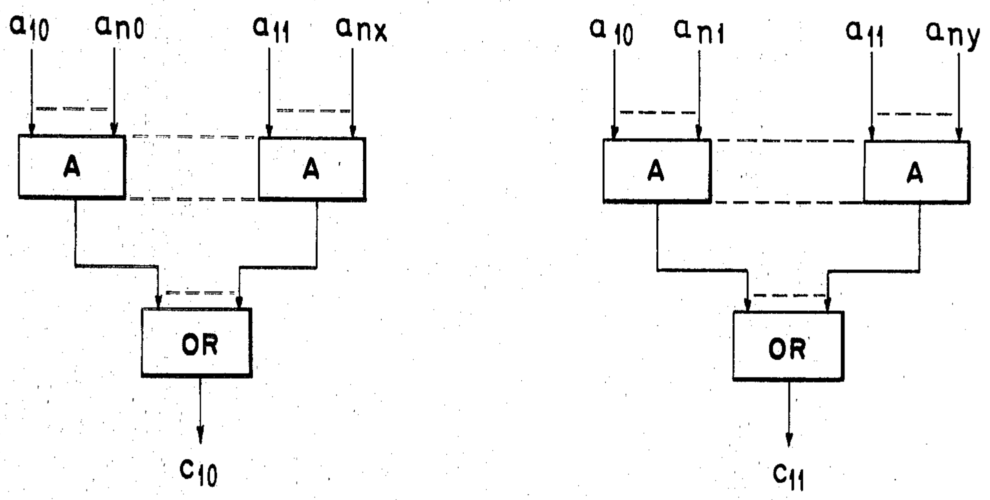
FIG. 7 comprises a logical schematic diagram with an alternative embodiment of a multiple signal pair input two-rail logic self-checking checker wherein the number of logic levels has been reduced to a minimum.

The circuit configuartions of the form shown in FIGS. 5 and 6 can be reduced to two (or more) levels of logic by manipulating the equations describing its function, using well-known techniques. One such two-level logic circuit is illustrated in FIG. 7. This circuit has $n$ input signal pairs:

$$a_{10},\ a_{11};\ a_{20},\ a_{21};\ \ldots\ ;\ a_{n0},\ a_{n1}$$

The circuit consists of $2^n$, $n$-input, AND gates feeding two, $2^{n-1}$ input, OR-gates. The inputs to each AND gate consist of one signal from each and every signal pair. There are $2^n$ such selections. Half of the AND gates each have as inputs an even number of "true" signals (i.e., $a_{21}$). The outputs of these gates are OR-ed together to form $c_{10}$. The other half each have as inputs an odd number of "true" signals. The outputs of these gates are OR-ed together to form $c_{11}$.

Figure 8:
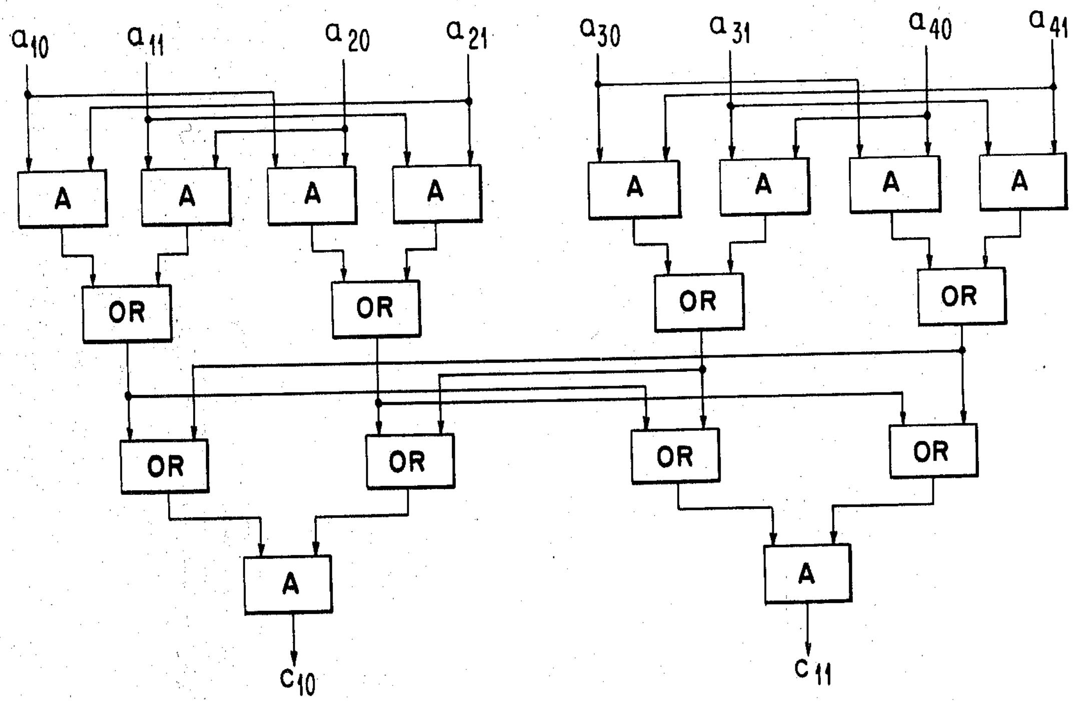
FIG. 8 comprises a logical schematic diagram of a self-checking checker constructed in accordance with the principles of the present invention wherein the first level of the basic circuit blocks comprising AND-OR circuits and wherein the second level comprises OR-AND blocks.
Figure 9:
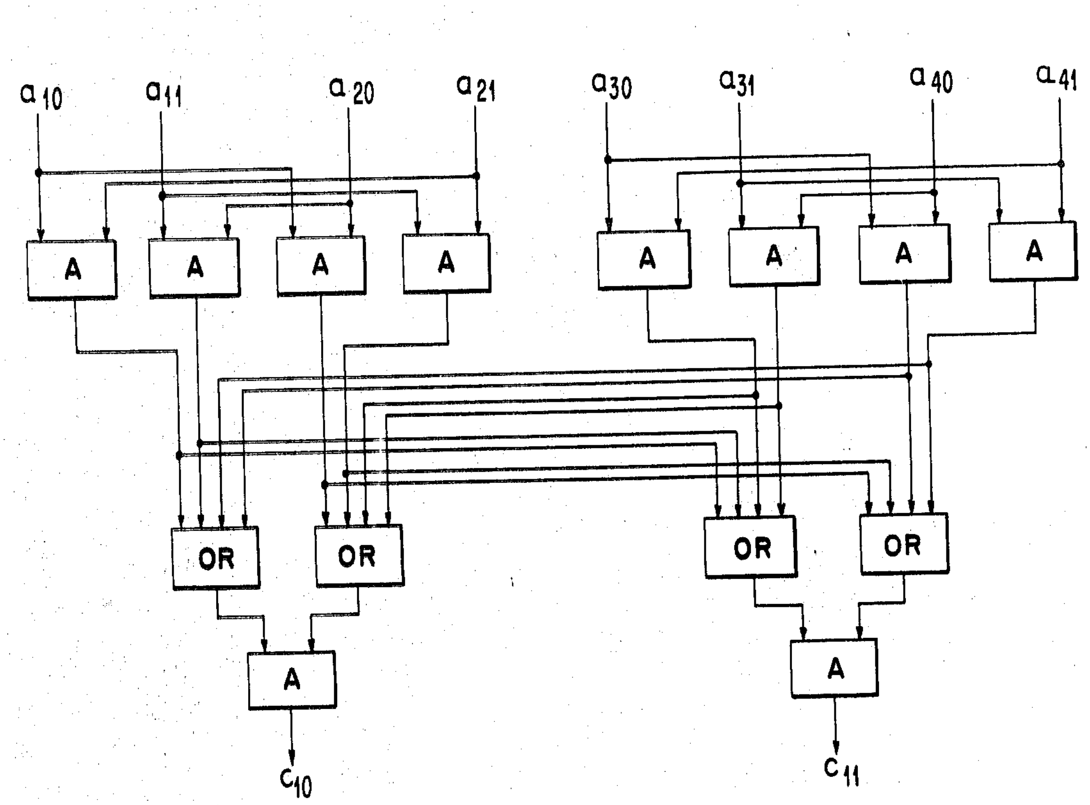
FIG. 9 illustrates the circuit simplification possible when a circuit design situation such as shown in FIG. 8 is encountered.

In any logic network, an OR-gate which feeds only other OR gates (or NOR gates) may be eliminated by increasing the number of inputs to the following gates. This also applies to AND gates feeding only other AND gates (or NAND gates). If the first level of gates produces both "true" and "complement" signals (as in a two-rail network and in the checkers described here), it is possible to apply the same technique to NAND gates feeding only OR gates (or NOR gates) and also to NOR gates feeding only AND gates (or NAND gates). Thus a considerable reduction in the number of logic levels can be effected in arrangements such as are shown in FIGS. 5 and 6 by choosing the component circuits in such a way that the last level of each can be merged with the first level of the one it feeds, using the technique indicated above. For example, alternate circuit levels may be constructed from the circuits of FIG. 1 and 2. FIG. 8 illustrates two circuit levels (containing OR's feeding OR's) which may be merged to form the circuit of FIG. 9.

Utilizing the above teaching, it will be apparent that a self-checking error checking circuit can be constructed for testing two-rail coded data at any point in a large computer system. The basic circuit design is the same regardless of the number of "pairs" present. Further, the design may be chosen to either reduce the overall number of logic levels to a minimum or to tailor the number of levels for various bit portions which are produced in time displacement relative to each other as in the output of an adder.

It will further be noted that the present two-rail logic checker may be used as a final checker to gather together the outputs of a plurality of other two output checkers for different coding systems such as shown in the two copending applications referenced earlier.

While the invention has been particularly shown and described with reference to preferred embodiments thereof, it will be understood by those skilled in the art that various changes in form and details may be made therein without departing from the spirit and scope of the invention.

What is claimed is:

1. A self-testing error checking circuit for use with two-rail logic coded data, said checking circuit comprising:

first and second logical circuit means connected to each of two groups of input data line pairs, said first and second logic circuit means each being adapted for normally producing an output signal pair having a predetermined data configuration, third logic circuit means for receiving the output of said first and second logic circuit means and for normally combining the input signals from said first and second logic circuit means to produce a single output signal pair having a predetermined data configuration, wherein the existence of said output from said third logical circuit means having said predetermined data configuration indicates an error free input code and proper operation of said checking circuit.

2. A basic self-testing error checking logic circuit block performing the logic function of a logical Exclusive OR circuit for use with two two-rail coded input data line pairs, said logic circuit block consisting of two logic circuit trees each tree connected to both input pairs and each producing an independent output, the outputs of said two logic circuit trees comprising a pair having a first data configuration when each input line pair has a complementary signal thereon and the circuit itself functions correctly, and the outputs of said logic circuit trees having a second data configuration when one of said input pairs has the same binary value or when the logic circuit itself malfunctions.

3. A self-testing error checking circuit as set forth in claim 2 wherein any two-rail Exclusive OR circuit may be constructed of a first level of AND gates and a second level of OR gates.

4. A self-testing error checking circuit as set forth in claim 2 wherein any given two-rail Exclusive OR circuit may be constructed of a first level of OR gates and a second level of AND gates.

5. A self-testing error checking circuit as set forth in claim 2 wherein any of said two-rail Exclusive OR circuits may be constructed of two levels of NAND gates.

6. A self-testing error checking circuit as set forth in claim 2 wherein any one of said Exclusive OR circuits may be composed of two levels of NOR gates.

7. A self-testing error checking circuit as set forth in claim 2 wherein the individual logical circuit elements of each said two-rail Exclusive OR circuit may be merged with adjoining logical circuit elements of adjacent two-rail Exclusive OR circuits when the logical function performed by at least two said interconnected logical circuit elements may be performed by a single logical circuit element.

8. A self-testing checking circuit including a plurality of logic blocks as set forth in claim 2 which are connected in a tree configuration wherein each of the two logic block input pairs is connected to either a checking circuit input pair or the output pair from a preceding logic block and wherein each checking circuit input pair is connected to one of said logic blocks.

References Cited

UNITED STATES PATENTS

| | | | |
|---|---|---|---|
| 2,958,072 | 10/1960 | Batley | 340—146.1X |
| 3,387,263 | 6/1968 | Dosse | 340—146.1X |

OTHER REFERENCES

Sellers et al.: Error Detecting Logic for Digital Computers, McGraw-Hill, 1968, pp. 143 thru 149.

MALCOLM A. MORRISON, Primary Examiner

C. E. ATKINSON, Assistant Examiner

U.S. Cl. X.R.

235—153